June 11, 1935.  W. A. READY  2,004,538
HANDLE
Filed Aug. 10, 1934
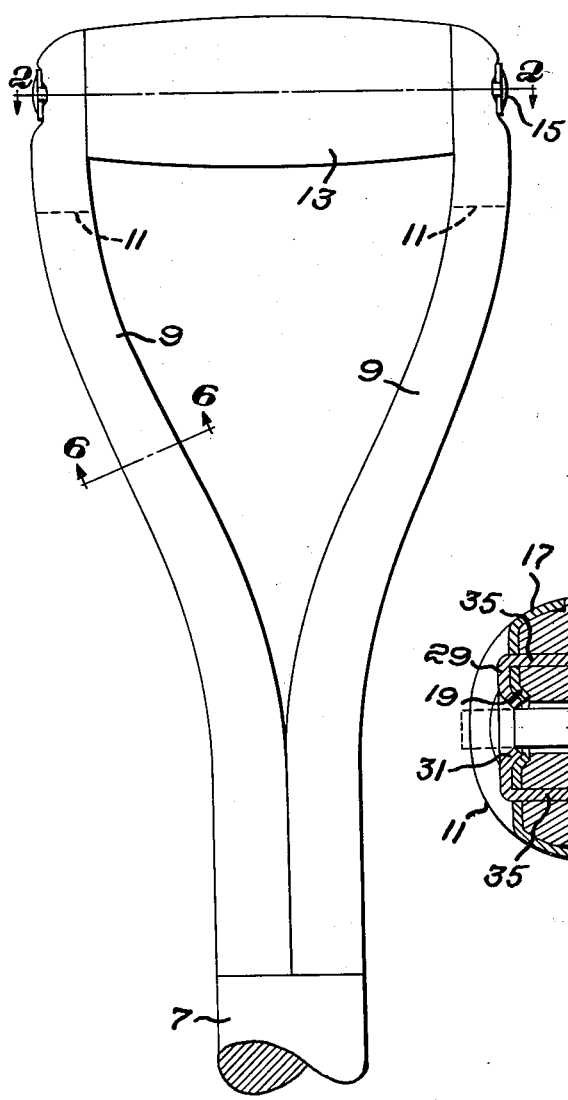
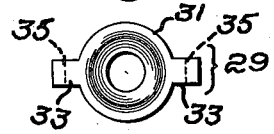
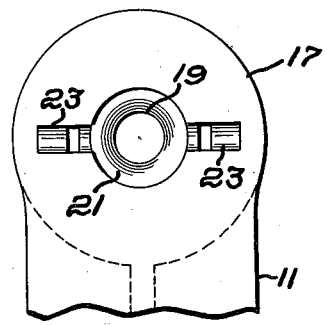
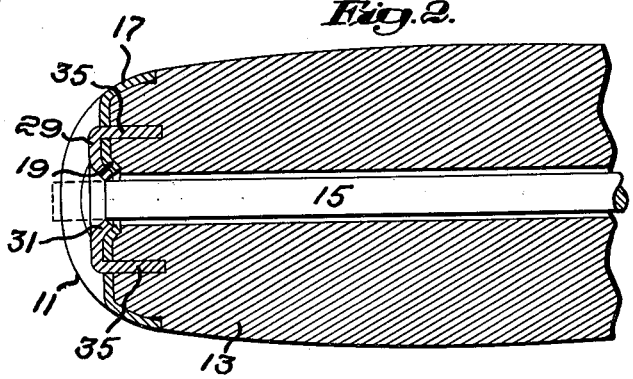
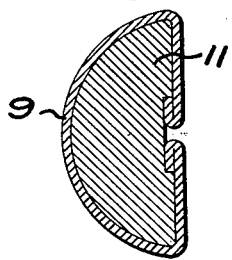
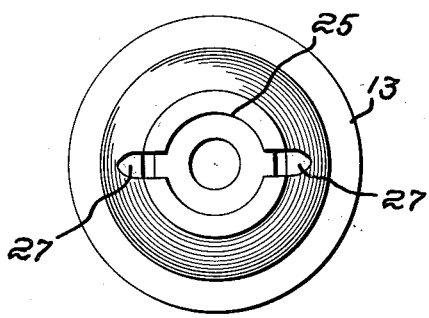
Inventor:
William A. Ready,
by Emery, Booth, Varney & Townsend
Attys Patented June 11, 1935

2,004,538

UNITED STATES PATENT OFFICE 2,004,538

HANDLE

William A. Ready, Brookline, Mass., assignor to Ames Baldwin Wyoming Co., Parkersburg, W. Va., a corporation of Delaware Application August 10, 1934, Serial No. 739,245

5 Claims. (Cl. 294—57)

This invention relates to the handles of shovels or the like and more particularly to handles of the D type having arms of sheet metal between which is received a cross-grip, usually of wood. The object of the invention is to provide a simple and inexpensive construction for such handles providing a secure and durable connection between the parts.

My invention will be well understood by reference to the following description of the illustrative embodiment shown by way of example in the accompanying drawing, wherein:—

Fig. 1 is an elevation of a form of handle illustrative of my invention;

Fig. 2 is a fragmentary section on the line 2—2 of Fig. 1 on a larger scale;

Figs. 3, 4 and 5 are successive and separate elevations of various parts as seen from the left in Fig. 2; and Fig. 6 is an enlarged section on the line 6—6 of Fig. 1.

Referring to Fig. 1 of the drawing, I have there shown a shovel construction of the type having a wooden stale 7 and hollow sheet metal arms 9 into which the divided end portions 11 of the stale extend and are anchored. Between the ends of the arms 9 a wooden cross-grip 13 is received and held in position by the through rivet 15. The construction so far described may be similar to that disclosed in my Patent No. 1,844,681, dated Feb. 9, 1932, and manufactured in the same manner.

In the embodiment of my invention herewith illustrated I provide for a secure connection between the ends of the arms 9 and the grip which may be quickly made and will be durable without danger of breaking or loosening due to yielding of the thin sheet metal of the arms where the rivet is headed over thereon and which is also effective in holding the grip 13 against turning.

Herein the ends of the arms 11, as best seen in Figs. 2 and 5, are formed with inwardly concave cup-like portions 17 in which the ends of the grip 13 are received. These portions may, as herein disclosed, be surfaces of revolution about the rivet 15 as an axis. Referring now to Fig. 4, the bottom of the cup is pierced at 19 to pass the rivet and has an annular inwardly embossed portion 21 about the hole and inwardly embossed extensions therefrom at either side thereof. The end of the grip 13, as seen in Fig. 5, is cut away at 25 and 27 so that the embossed portions 19 and 23 respectively are received therein and interlock therewith. It will be noted that the parts 23 form keys resisting rotation of the grip within the cup.

Outwardly of the cupped ends 17 of the arms are provided the washer-like members 29, best seen in Fig. 3, which may be formed of relatively heavy metal having the centrally perforated central portion 31, preferably cupped to enter the portion 19 at the end of the handle arm in the manner shown in Fig. 2 and the lateral extensions or arms 33 received within the seats provided by the inwardly embossed extensions 23. These arms thus lie in the nested extensions 23 and 27 reinforcing the relatively thin sheet metal walls of the former and serving as keys. The ends of the arms are inturned to provide the prongs 35, best seen in Fig. 2, which extend through the sheet metal of the arms and enter the wood of the grip 13 at points radially remote from the center, further locking the parts together. The rivet 13 extends through the handle and may be headed over on the portion 31 of the washer-like members 29. In Fig. 2 I have shown the rivet in dotted lines as it would appear before this end was upset.

The rivet binds all the parts together and provides an efficient connection. The heading over of the rivet can be quickly effected with comparatively little care since an adequate bearing for the head is provided. Any strain both in assembling or later in use on the thin sheet metal of the arms is effectually distributed and a secure and durable construction resuts.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A handle construction for shovels and the like comprising sheet metal arms, a cross-grip between them, washer-like members overlying the ends of the arms having an eccentrically located part passing through the metal and entering the grip, and headed fastening means securing the arms against the ends of the grip having heads cooperating with said members.

2. A handle construction for shovels or the like comprising sheet metal arms having cupped ends, a cross-grip seated in the ends, washer-like members over said ends having arms extending laterally and inturned to pass through the sheet metal and into the grip, and headed fastening means securing the arms against the ends of the grip having heads cooperating with said members.

3. A handle construction for shovels and the like comprising sheet metal arms having cupped ends, a cross-grip having its ends received in the cups, the bottoms of the cups having inwardly embossed therein a central portion with lateral extensions, a cross-grip between said ends into which embossed parts are received, external washer-like members fitting the embossing, and a rivet extending through the grip and having heads bearing on said members.

4. A handle construction for shovels and the like comprising sheet metal arms having cupped ends, a cross-grip having its ends received in the cups, the bottoms of the cups having inwardly embossed therein a central portion with lateral extensions, a cross-grip between said ends into which embossed parts are received, external washer-like members fitting the embossing and having inturned terminal portions passing through the sheet metal and into the grip, and a rivet extending through the grip and having heads bearing on said members.

5. A handle construction for shovels and the like comprising generally hollow sheet metal arms having cup-shaped ends, a cross-grip between them having its ends received in the cups, exterior members of non-circular outline depressed into the ends of said arms and the ends of the grip to key them together, and a rivet extending through the grip and through said members and having heads exteriorly bearing on the latter.

WILLIAM A. READY.